No. 743,681.

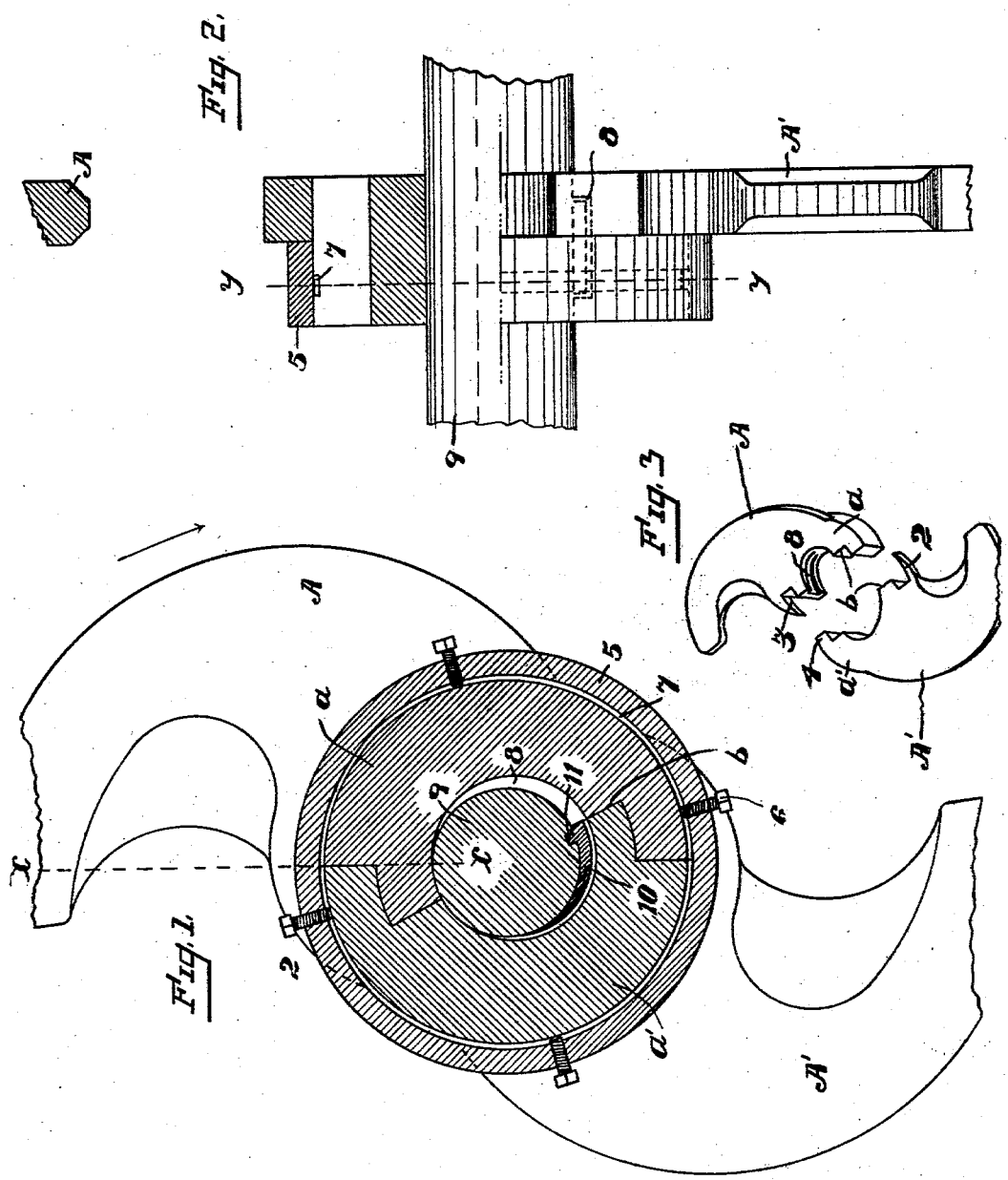

Patented November 10, 1903.

UNITED STATES PATENT OFFICE.

AUGUST P. J. BOSSELL, OF ANGELS CAMP, CALIFORNIA.

SECTIONAL CAM FOR ORE-STAMPS.

SPECIFICATION forming part of Letters Patent No. 743,681, dated November 10, 1903.

Application filed February 26, 1903. Serial No. 145,194. (No model.)

*To all whom it may concern:*

Be it known that I, AUGUST P. J. BOSSELL, a citizen of the United States, residing at Angels Camp, county of Calaveras, State of California, have invented an Improvement in Sectional Cams for Ore-Stamps; and I hereby declare the following to be a full, clear, and exact description of the same.

My invention relates to improvements in cams for lifting stamps in quartz and like mills. Its object is to provide a cam which can be quickly put on and taken off of a shaft without disturbing the other cams on the shaft or without the necessity of dismantling nearly the entire battery, as is so often the case in mills where the ordinary solid one-piece cams are used; also to provide a simple means of securely locking the cam on the shaft without weakening any of the parts.

The invention consists of a two-part cam of the following description, having reference to the accompanying drawings, in which—

Figure 1 is a side elevation with hub in section on line $y\ y$, Fig. 2. Fig. 2 is an end view in partial section on line $x\ x$, Fig. 1. Fig. 3 is a reduced perspective of the two parts.

A A' represent two complementary interchangeable cam-sections of equal size having the respective interlocking hub portions $a\ a'$. The line of separation between the two sections is of such character and is so located in relation to the striking-surfaces of the cam that when a point strikes and lifts a tappet the tendency of the sections to separate will be neutralized as far as possible and undue strain on the cam relieved. The sections are divided at nearly opposite points on the hub on lines substantially within the ends of the cams. The back of each section carries a curved tang or segmental bracket 2, which bears upon the hub portion of the opposite section and serves to resist the thrust exerted by the cam-points striking the tappet.

Each hub-section is provided with a curved recess 3, of which its respective bracket 2 forms the outer wall, into which recess is let a corresponding projection 4 on the opposite section.

In each section the projection 4 is nearly diametrically opposite to the curved tang 2 of the same section, and the arc inclosed between these parts is greater than a half-circle. The only way to unite the two sections is to slip them together sidewise. The parts have a snug sliding fit, and when the opposed cam-points are brought into the same plane the sections form one rigid structure capable, by reason of the brackets 2 and the interlocking projections 4, of resisting a very considerable amount of strain without other securing means. However, in order to further strengthen the cam and render it absolutely stanch and rigid a ring or tire 5 is driven on over the united hub, and to prevent the ring working loose set-screws 6 may be employed to engage in a peripheral groove 7 in the hub.

The means of attaching and locking a cam to a shaft is as follows: Each hub-section has a cam-groove 8 in the surface which bears on the shaft. These grooves are parallel with the plane of the cam, or, in other words, run in a direction around the shaft and are entirely within the hub, so that when the cam is locked on a shaft, as 9, neither the grooves nor the key 10 which they contain is visible. These grooves are so disposed in relation to each other that each has its deepest part contiguous to the other, so that when the sections are united, as in Fig. 1, the grooves in the two hubs will be continuous and eccentric to the hub-bore and shaft.

The key 10 is a segmental wedge adapted to seat in the groove of either section and to have its exposed surface concentric with the surface of the walls of the bore when its thicker end is flush with the edge of section A', as indicated in Fig. 1. The key is held from turning independently of the shaft by means of a projection 11 fitting a recess in the shaft.

In operation section A', with key in position as in Fig. 1, is laid against the shaft with the key and cam-face turned in the direction of contemplated rotation and projection 11 engaged in the notch in the shaft, and section A then slipped in from the side to engage A' and inclose the shaft, and the ring 5 (which, with the rings necessary for the other cams, has been slipped onto the shaft before the latter is finally set in its bearings) driven onto the hub. The shaft and key will be stationary in relation to each other, while the cam will be turnable to a limited degree about the key and shaft. As the shaft is turned in the direction of the arrow, the moment the cam strikes a tappet the cam movement will be arrested an instant till the continued rotation of the shaft drives the key into the shallower portion of the groove of section A' to form a frictional bond between the cam and shaft, whereupon the cam and shaft are revolved as one rigid unitary structure.

The walls of the keyways in the hub serve as guides to prevent absolutely any side slip or shift of the cam on the shaft.

When it is desired to remove a cam, it is a simple matter on stopping the shaft to turn the cam in the opposite direction to bring the line, as indicated by b, between the hub-sections coincident with thicker end of the key, whereupon on the removal of ring 5 the sections are easily slipped apart.

In order to locate the position of the end of the key, the shaft is provided with a mark outside the hub and in line with the key end. When line b coincides with that mark, it is known that the parts are in the required position.

The advantages of such a cam construction may be summarized as follows: The cams can be quickly put on and taken off of a shaft without disturbing the other parts of a battery and are adjustable as right or left cams, according to the direction in which they turn. By disposing the holes for the projections 11 of the keys at suitable points along and around the shafts the cams are quickly adapted to any system of stamp-drop either for splash or wash batteries. The locking means is concealed, and in no way does it weaken the shaft or cam. The key being segmental bears on a large area of the cam and shaft, and with the otherwise close fit of the cam on the shaft the cam is supported practically at all points. The shoulders or tangs bearing each on the complementary section afford an additional support to the ring.

Having thus described my invention, what I claim, and desire to secure by Letters Patent, is—

1. In a cam, the combination of two separable members having interlocking hub-sections divided on lines substantially within the ends of the cam, each of said cam members formed integral with a curved tang or segmental flange which overlaps the line of division of the hub and is adapted to bear upon an opposite hub-section, each hub-section having a curved recess of which the segmental flange forms an outer wall and a projection on one section adapted to fit the recess of the opposing section, and said sections having cam-grooves in their bearing-surfaces, and a segmental key slidable in said grooves.

2. An improved cam consisting of two separable members having interlocking hub-sections divided on lines substantially within the ends of the cam, each of said members formed with a curved or segmental flange which overlaps the line of division of the hub and bears upon an opposite hub-section, each hub-section having in its meeting face a recess, one wall of which is formed by said flange, and the projection of one section adapted to fit the recess of the opposing section, said hub-sections having cam-grooves in their bearing-surfaces, a segmental key incased and slidable in said cam-grooves, there being a projection on the key engaging a recess in the shaft to lock the key thereto, and a ring embracing the hub-sections.

In witness whereof I have hereunto set my hand.

AUGUST P. J. BOSSELL.

Witnesses:
   A. T. LEE,
   C. H. ALLEN.